Figure 1:
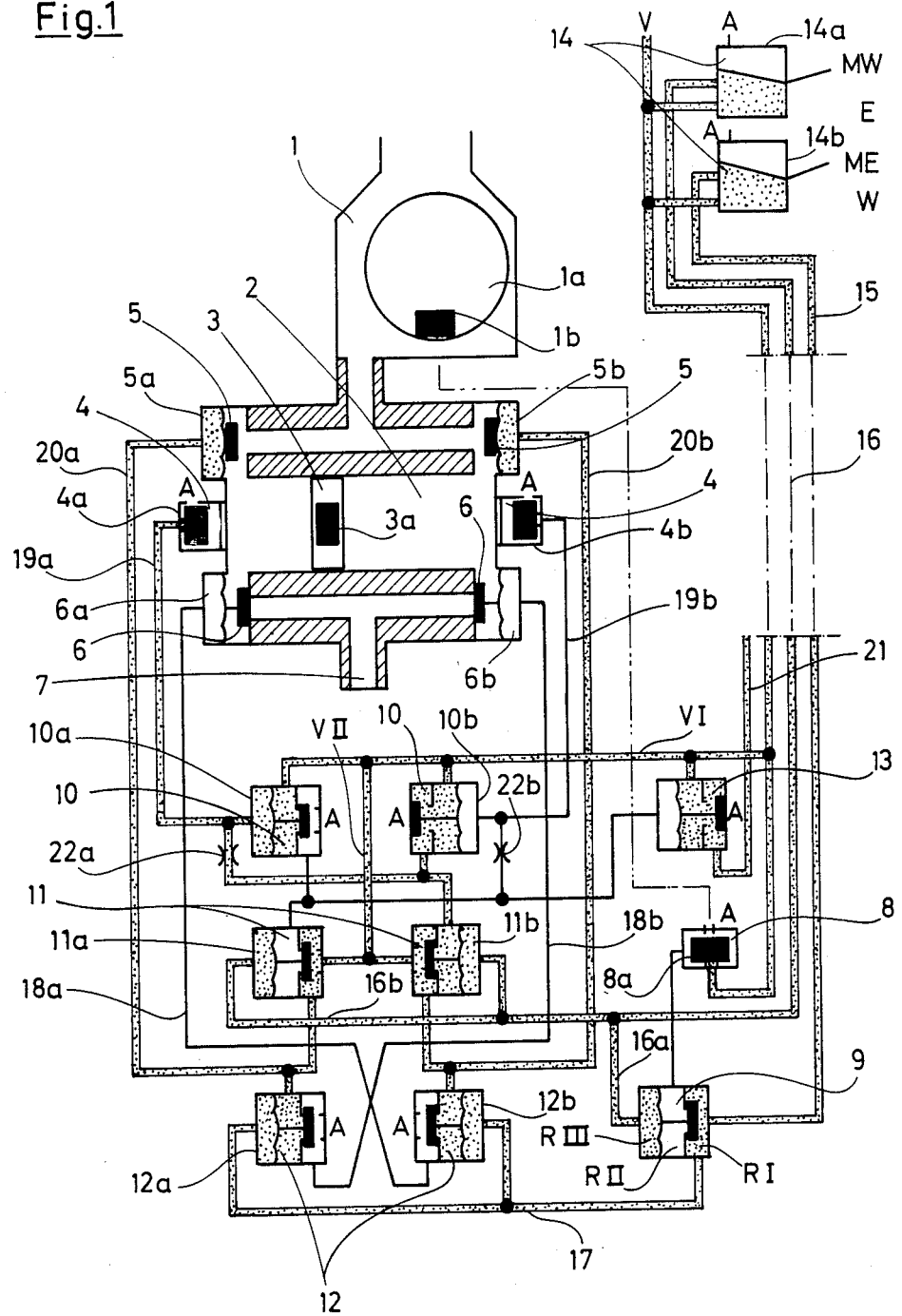

United States Patent [19]

Johannesson

[11] Patent Number: 4,610,163
[45] Date of Patent: Sep. 9, 1986

[54] METERING APPARATUS

[75] Inventor: Leif B. Johannesson, Tumba, Sweden

[73] Assignee: Alfa-Laval Agri International AB, Tumba, Sweden

[21] Appl. No.: 629,821

[22] PCT Filed: Nov. 17, 1983

[86] PCT No.: PCT/SE83/00404
  § 371 Date: Jul. 5, 1984
  § 102(e) Date: Jul. 5, 1984

[87] PCT Pub. No.: WO84/01999
  PCT Pub. Date: May 24, 1984

[30] Foreign Application Priority Data

Nov. 18, 1982 [SE] Sweden ................................ 8206567

[51] Int. Cl.$^4$ ................................................ G01F 3/16
[52] U.S. Cl. ........................................ 73/250; 73/239; 119/14.14
[58] Field of Search .................. 73/200, 239, 249, 250; 119/14.14, 14.15, 14.16, 14.17

[56] References Cited

U.S. PATENT DOCUMENTS

| | | | |
|---|---|---|---|
| 3,073,159 | 1/1963 | Glasgow | 73/249 |
| 3,439,706 | 4/1969 | Barrett | 73/239 |
| 3,657,925 | 4/1972 | Gross | 73/239 |
| 4,053,084 | 10/1977 | Wilde | 73/249 |
| 4,192,185 | 3/1980 | Keilholz | 73/249 |
| 4,476,719 | 10/1984 | Millar | 73/200 |

FOREIGN PATENT DOCUMENTS 2422937 11/1979 France ................................ 73/249

*Primary Examiner*—Herbert Goldstein
*Attorney, Agent, or Firm*—Cyrus S. Hapgood

[57] ABSTRACT

An apparatus which functions as a combined outlet valve and a meter for a fluid. The apparatus comprises a space (2) in which a piston means (3) is reciprocatable and which is in connection with an inlet conduit and an outlet conduit on each side of the piston (3), each of said conduits being provided with a shut-off valve (5a, b; 6a, b). According to the invention the adjustment of the shut-off valves (5a, b, 6a, b) is effected by means (4, 8-14) acting by vacuum and/or atmospheric air.

13 Claims, 9 Drawing Figures

Fig. 6
Fig. 6c
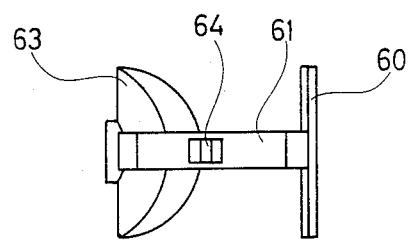
Fig. 6a
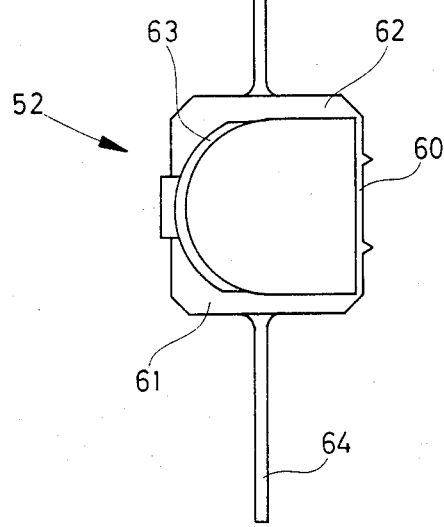
Fig. 6b
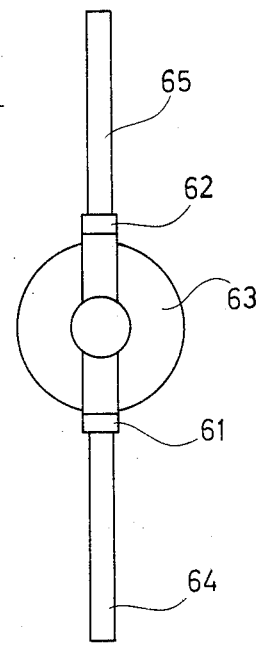

METERING APPARATUS

This invention relates to an apparatus for metering the volume of a fluid, preferably in connection with milking, comprising a metering chamber in which a piston means is reciprocatable between two end positions, each piston-stroke corresponding to a certain volume, and the chamber being in connection with a fluid inlet conduit and a fluid outlet conduit on each side of the piston, each of said conduits being provided with a shut-off valve, and the piston being adapted at each of its end positions to activate a means which is adapted to initiate adjustment of the shut-off valves.

When milking cows there is a wish to meter the milk delivered by the cows. In this connection a usual way is to collect milk from one or several cows in a so called recorder-receptacle, whereafter the content of the receptacle is read off according to a graded scale on the receptacle. When emptying the receptacle a valve is manually opened so that the milk can be delivered from the receptacle to a collecting conduit. After finished emptying the manual valve is shut and the recorder-receptacle is again supplied with milk.

The present recorder milking system has at least two disadvantages. Firstly, a valve often hard to find and hard to adjust is manually opened and shut when the recorder-receptacle shall be emptied and filled, respectively. Secondly, it can often be hard to read off the volume in the recorder-receptacle due partly to the position of the receptacle (parallax-error), partly to the fact that the receptacle can easily be made dirty, and partly to the fact that there is often foam on the milk surface.

Therefore, there have been wishes about a cheap but yet reliable system for metering the milk at recorder milking.

This invention intends to make these wishes possible.

According to the invention that is achieved by the fact that the apparatus comprises means adapted to adjust the shut-off valves by means of vacuum and atmospheric air.

By the invention it will be possible to use the existing system for the operation of the milking plant for governing the functions of the milk meter.

Swedish patent No. 380.347 and U.S. Pat. No. 3,073,159 disclose both apparatuses of that kind mentioned in the introductory part of the specification. Both these apparatuses, however, distinguish from this invention regarding the governing of the functions of the milk meters. Thus, the functions according to the Swedish patent are governed in an electric way while the functions according to the US patent are governed by means of a pressurized medium.

Figure 2:
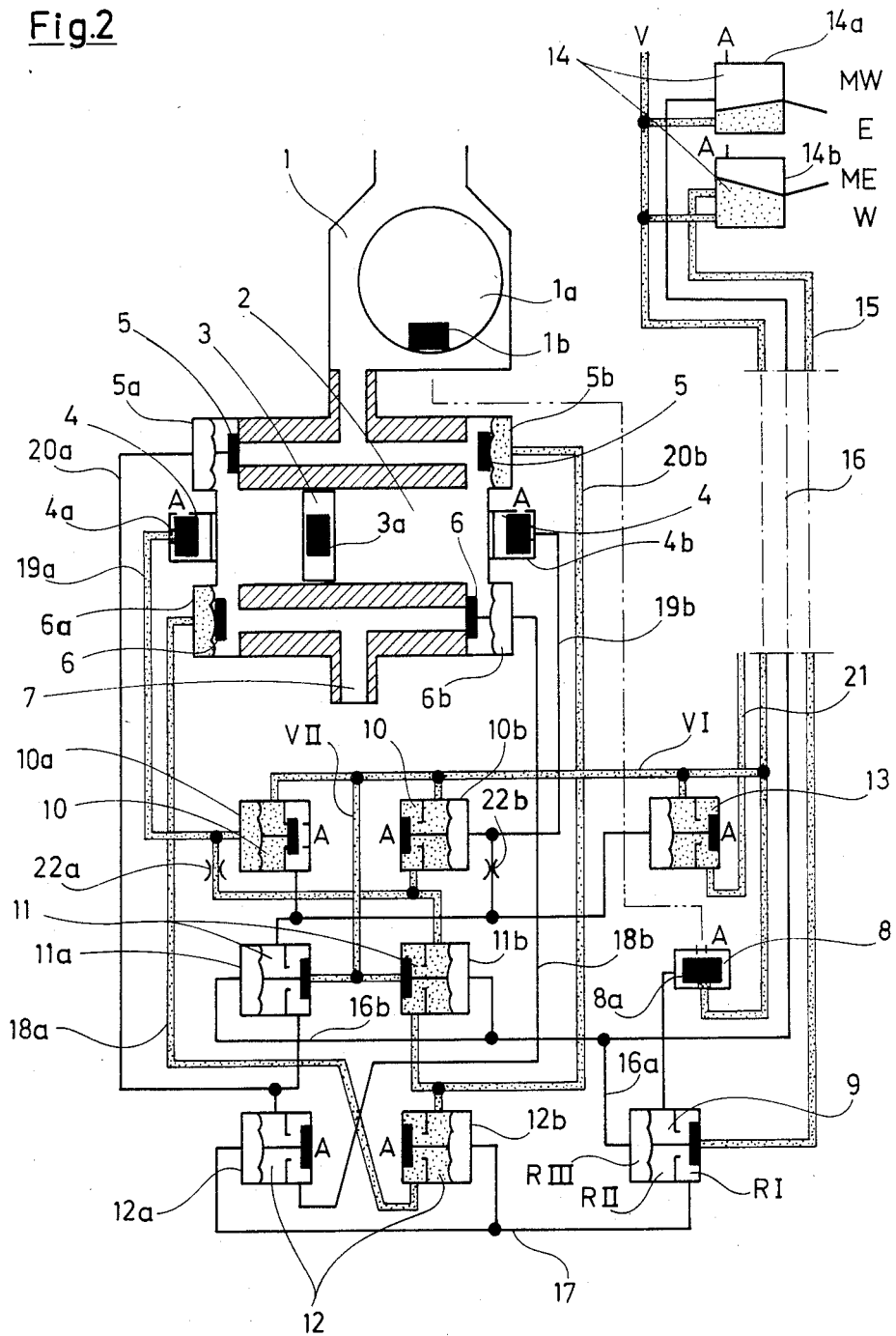
Figure 3:
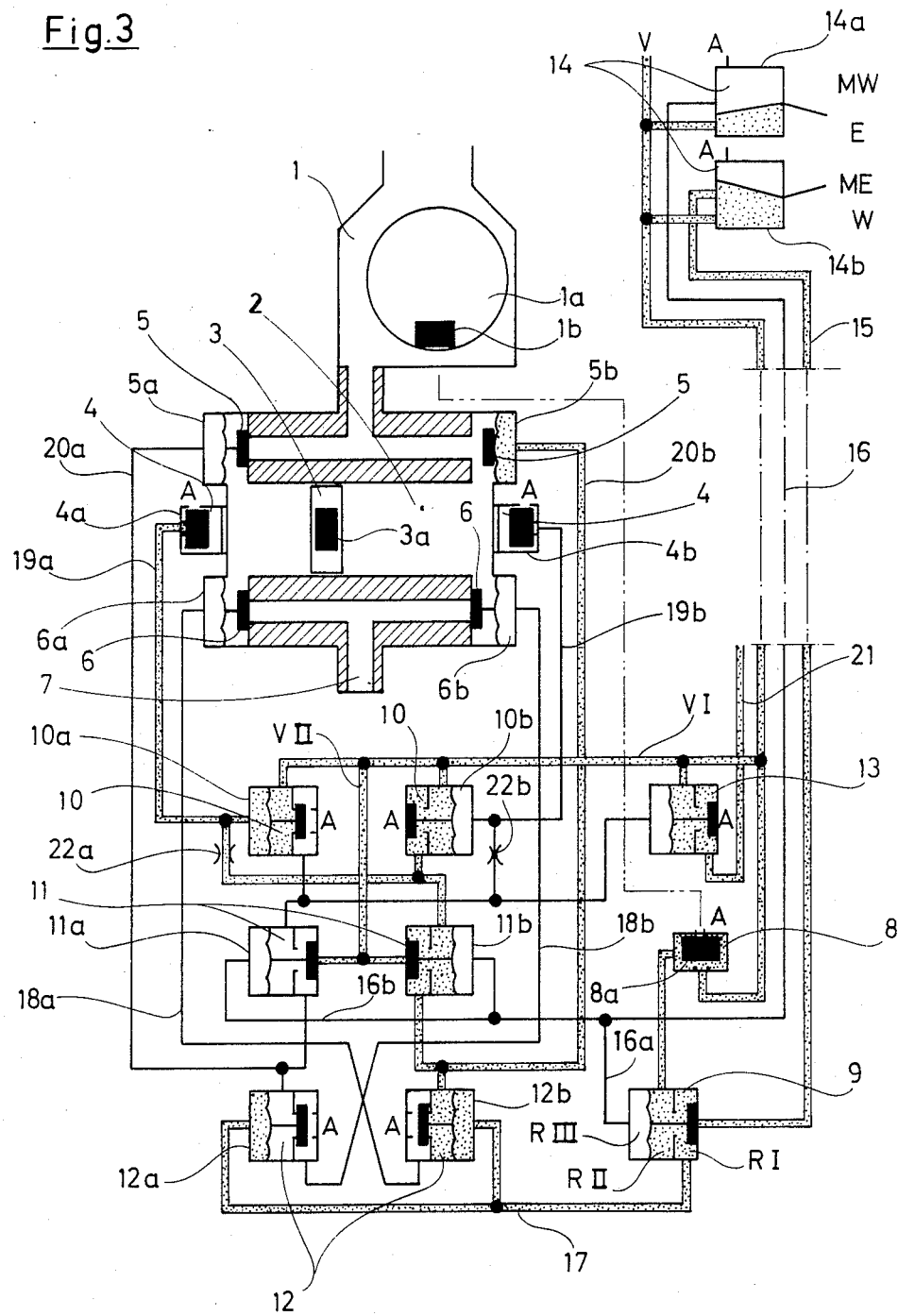
Figure 4:
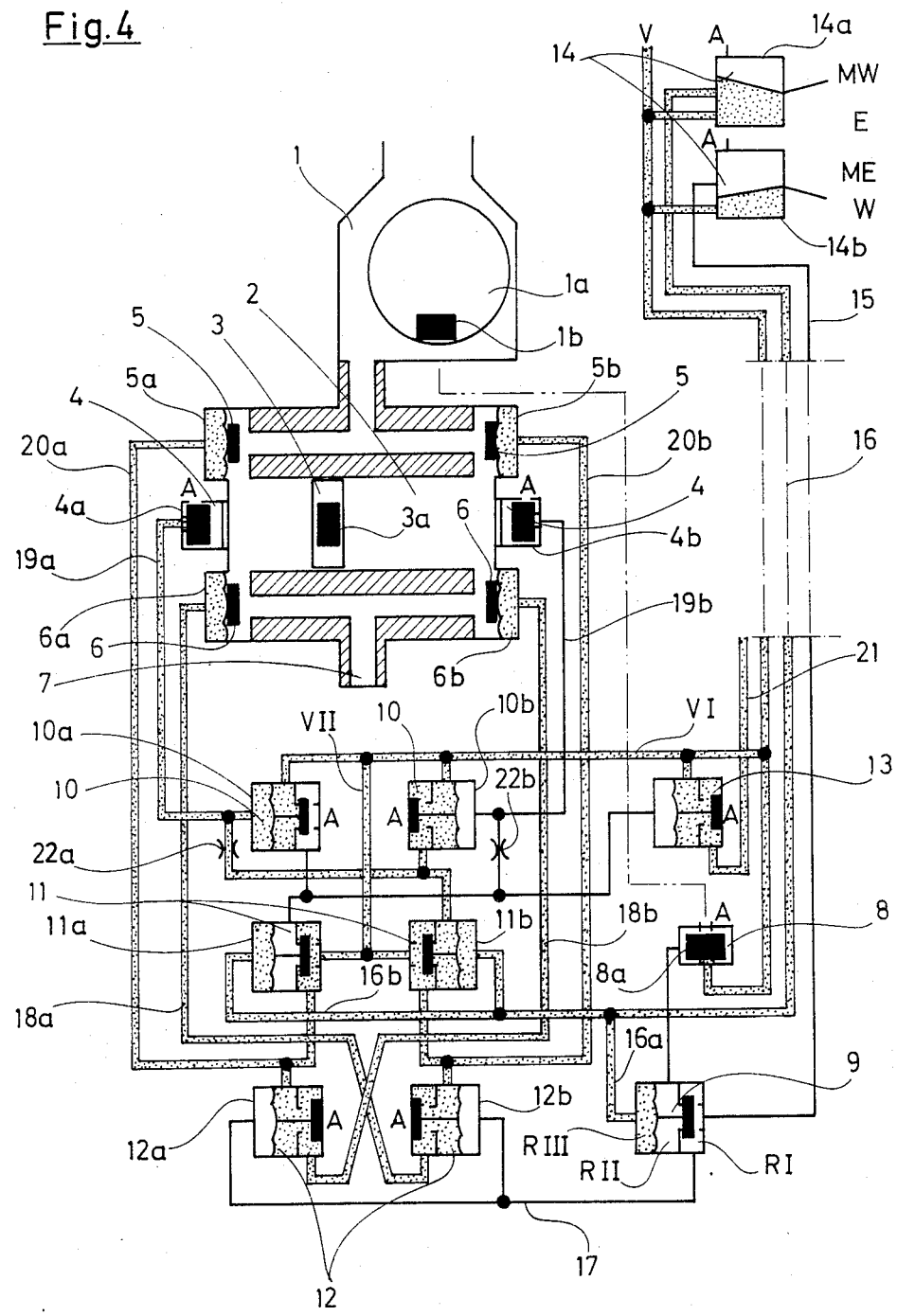
Figure 5:
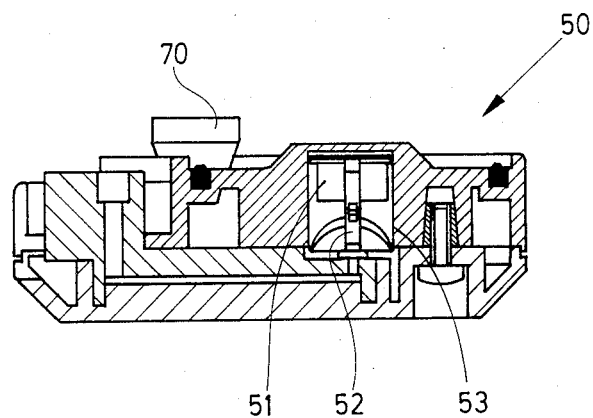
Figure 7:
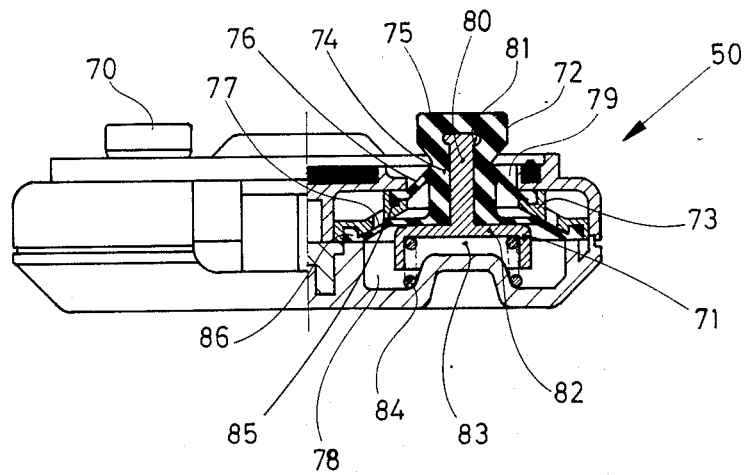

A preferred embodiment of the invention is described below with reference to the accompanying drawings, in which FIG. 1 shows a schematic sketch of the apparatus during the milking phase, FIG. 2 shows the apparatus during the emptying phase, FIG. 3 shows the apparatus at shut-off, FIG. 4 shows the apparatus at cleaning, and FIG. 5 shows a gable wall of the metering cylinder, FIGS. 6a–6c show a holder for the magnet in the gable wall, and FIG. 7 shows one of the shut-off valves of the gable wall in section.

Referring to FIGS. 1–4 the reference marks 1–14 relate to the following details:
1=receptacle; 1a =float
2=metering cylinder
3=floating piston
4=2 magnet valves
5=2 inlet valves
6=2 outlet valves
7=base for the connection to a milk transport conduit
8=level control valve
9=vacuum relay for level control
10=2 vacuum relays connected as a bistable circuit
11=2 vacuum relays for governing the inlet valves
12=2 vacuum relays for governing the outlet valves
13=vacuum relay for governing a counter or an electronic transmitter
14=2 three-way valves.

Moreover, in FIGS. 1–4 there are drawn a number of A. With an A at a detail is meant that the detail referred to has a connection with the atmosphere, which connection in certain cases can be closed.

In FIGS. 1–4 a line V is also shown which is in connection with the ordinary vacuum line of the system and is accordingly constantly under vacuum. Moreover, in the figures points of intersection, i.e. places where a line has a connection with another line, have been marked with red.

The thick lines in FIGS. 1–4 contain vacuum, while the thin lines contain atmospheric air. Furthermore, the shadowed parts of valves and relays indicate that vacuum exists there, while the light parts indicate atmospheric pressure.

Each vacuum relay comprises three chambers RI, RII and RIII. In this connection the chambers RII and RIII are separated by means of a membrane. In this membrane one end of a shaft is fastened, the other end of which carries a valve. This valve in one of its positons shuts off the connection between the chambers RI and RII and in its other position the connection between the chamber RI and the atmosphere or between RI and a line connected with RI.

The level control valve 8 is normally sitting under and adjacent to the receptacle 1 but has in FIGS. 1–4 been moved downwards to the vicinity of the vacuum relay 9 for the level control.

When milking, one of the three-way valves is adjusted to a position MW and the other one to position ME. This means that both lines 15, 16 from the two three-way valves 14 are put under vacuum, because the valves 14 have connection with the central vacuum line V.

The recorder receptacle 1 is under vacuum and when milk begins streaming into the receptacle 1 the float 1a is lifted from the bottom of the receptacle. In the bottom of the float there is a magnet 1b that influences another magnet 8a being in the level control valve 8 such that this magnet 8a shuts off the connection of the valve 8 with the atmosphere. When the float 1a is now lifted from the bottom of the receptacle, the connection with the magnet 8a is cut off, whereby atmospheric air penetrates into the valve 8 and moves the magnet 8a towards the bottom of the valve 8 and shuts off the connection with the vacuum line V.

Inside the level control valve there exists atmospheric air. This leads to that the chamber RII of the vacuum relay 9, which chamber has connection with the valve 8, is put under atmospheric pressure. Since the chamber RIII is under vacuum via the vacuum line 16a, the membrane and the valve of the relay 9 are influenced such that the valve closes the connection between the chambers RI and RII. Due to that a connection between the vacuum line 15 and the line 17 is opened via the chamber RI so that the line 17 is also put under vacuum. This line 17 has connection with the chamber RIII in each of the vacuum relays 12a, b. Since the chambers RIII in the relays 12a, b are under vacuum the connection between the chambers RI and RII in 12a, b is closed. This leads to that the connection between the atmosphere and the chambers RI in 12a, b is opened, whereby these chambers RI are put under atmospheric pressure. The chambers RI in 12a, b are in connection with the outlet valve 6a, b via the lines 18a, b. Due to that the valves 6a, b are put under atmospheric pressure, which has the consequence that they are closed.

The vacuum relays 10a, b are in connection with respective magnet valve 4a, b via lines 19a, b. The chambers RII in 10a, b are in connection with the vacuum line VI and accordingly are under vacuum. Due to the fact that RII in 10b is under vacuum also the chamber RI in 10b is put under vacuum, because in the initial phase the valve in the relay 10b has such a position that the connection between RI and RII is open. The chamber RI in 10b has connection with the chamber RIII in 10a having the consequence that the chamber RIII is also put under vacuum. This in its turn leads to that the connection between RI in 10a and the atmosphere is opened, whereby RI is put under atmospheric pressure. Since RI is in connection with RIII in 10b also RIII and the line 19b from this chamber to the magnet valve 4b are put under atmospheric pressure. On the other hand the line 19a to the magnet valve 4a is put under vacuum, since it has connention with the chamber RIII in 10a and the line from the chamber RI in 10b.

The chambers RI in the relays 11a, b are in connection with the vacuum line VII. Furthermore, the chambers RIII in 11a, b are in connection with the vacuum line 16b. Since the chamber RII in 11a is under atmospheric pressure via the connection with RI in 10a, the connection between the chamber RI in 11a and the line VII is open, and, therefore, this space is under vacuum. The chamber RI in 11a has connection with the inlet valve 5a via the line 20a. Thus, this inlet valve 5a is also put under vacuum having the consequence that the valve 5a is opened.

Since the chamber RI in the relay 11b is under vacuum also the inlet valve 5b is influenced such that it is opened, because it is in connection with the chamber RI via the line 20b.

The vacuum relay 13 is used for operation of a counter or an electronic transmitter. The chamber RIII in 13 is in connection with the chamber RI in 10a, wherefore RIII in 13 is under atmospheric pressure. Since at the same time the chamber RII in the relay 13 is under vacuum via the vacuum line VI the relay 13 is influenced such that the connection between RII and RI in 13 is opened. This leads to that the relay 13 via the chamber RI and the line 21 emits a vacuum signal to the counter or the electronic transmitter.

Thus, during the milking both inlet valves 5a, b are open so that milk streams into the metering cylinder 2 on both sides of the piston 3. The reason why is that air shall be evacuated from the cylinder.

When the milking is finished and the receptacle shall be emptied the three-way valve 14a is switched over to position E, while the valve 14b keeps its prior position ME (see FIG. 2). By changing the position of the valve 14a to E the line 16 is put under atmospheric pressure. This in its turn directly gets the following consequences: The chambers RIII in the relays 9, 11a and 11b are put under atmospheric pressure. Due to the fact that the chamer RIII in the relay 9 is put under atmospheric pressure, the membrane between the chambers RIII and RII is forced to the right in the figure, whereby the valve in the relay is moved to the right and closes the connection between the chamber RI and the vacuum line 15. Due to that the connection between the chamber RII also being under atmospheric pressure and the chamber RI is opened, having the consequence that the line 17 is put under atmospheric pressure. This in its turn leads to that also the chamber RIII in the relay 12b gets atmospheric pressure, whereby the valve in the relay 12b closes the connection to the atmosphere in the chamber RI and opens the connection between the chambers RI and RII. This opening of the connection gives vacuum in the chamber RI which is in connection with the outlet valve 6a via the line 18a. Since there is now vacuum in this line the valve 6a is opened.

Furthermore, one 5a of the inlet valves is closed so that the milk that comes into the metering cylinder 2 and shall be metered enters via the inlet valve 5b and gets out through the outlet valve 6a.

The inlet valve 5a is closed by influence via the line 20a and the relay 11a. The chamber RIII in this relay 11a has connection with the line 16b which is under atmospheric pressure. This means that the chamber RIII gets atmospheric pressure leading to that the valve in the relay 11a is influenced to move to the right so that the connection between the chamber RII being under atmospheric pressure and the chamber RI being under vacuum is opened. Due to that the chamber RI and by that the line 20a are put under atmospheric pressure, wherefore the inlet valve 5a is influenced to shut.

When emptying the receptacle 1 milk is streaming into the metering cylinder 2 via one of the inlet valves 5b and out through the diagonally located outlet valve 6a. The floating piston 3 flows with the milk stream until it reaches the end of the cylinder. In this position the magnet 3a of the piston 3 opens the magnet valve 4a so that atmospheric air streams into the line 19a. This leads to that the vacuum relays 10a, b that function as a bistable circuit is influenced such that signals are emitted to the inlet valve 5a, b and outlet valves 6a, b so that the valves having been open 5b, 6a are closed and those having been closed 5a, 6a are opened.

In this connection the piston 3 flows with the milk stream to the right until it reaches the right end position. In this position the magnet valve 4b is influenced by the magnet 3a of the piston 3 such that it is opened and lets atmospheric air into the line 19b. This leads to that the bistable circuit is once more influenced and gives signals to the inlet valves and the outlet valves so that they are shifted. This continues as long as there is milk left in the receptacle 1 so that the float is kept floating. Each time the piston reaches its end position a signal is given to the counter or the electronic transmitter via the relay 13 and the line 21. That means that this signal corresponds to a piston-stroke and that a certain volume, for instance 0.1 litre has passed the cylinder 2.

In order that the bistable circuit, i.e. the relays 10a shall function satisfactorily so that the shut-off valves directly reverse there are two throttlings 22a, b in the system. These throttlings function so that the adjustment of the relays 10a, b is speeded up when the magnet valves 4a, b are opened and closed, respectively, leading to that the lines 19a, b switch between vacuum and atmospheric pressure and vice versa.

If we as an example look at FIG. 1 we find that the magnet valve 4a is shut and that the line 19a is under vacuum. This vacuum is fed in via the line going through the throttling 22a and is also maintained in the chamber RIII in the relay 10a.

When the piston 3 is now approaching the magnet 4a this is attracted, whereby atmospheric air streams into the line 19a. At the same time the line going through the throttling 22a is fed with vacuum, wherefore the vacuum is maintained in the chamber RIII.

Due to the throttling 22a the vacuum feeding to the chamber RIII in the relay 10a is restrained wherefore the chamber RIII in the relay 10a is more rapidly filled with atmospheric air leading to that the relay 10a is reversed.

When there is no more milk in the receptacle 1 the float 1a sinks, whereby the magnet 1b in this one influences the magnet 8a of the magnet valve 8 such that the magnet 8a closes the connection to the atmosphere and opens the connection of the valve 8 with the vacuum line V.

In this connection the magnet valve 8 acting as a level control valve gives a signal to the vacuum relay 9 which in its turn gives a signal to the vacuum relays 12a, b for the outlet valves 6a, b so that these are closed.

From a technical point of view it functions in the following way: The magnet valve 8 is filled with vacuum, whereby the chamber RII and by that the chamber RI in the relay 9 are also filled with vacuum. This in its turn leads to that the chambers RIII in the relays 12a, b are filled with vacuum having the consequence that the connection between the chambers RI in 12a, b and the atmosphere is opened whereby the chambers RI are put under atmospheric pressure. From these chambers RI lines 18a, b extend to the outlet valves 6a, b which are accordingly influenced to close (see FIG. 3).

During the automatic shut-off phase (see FIG. 3) one of the inlet valves 5a, b is kept open. The reason why is that the milk created by the foam that is often left in the receptacle 1 after the emptying phase is utilized and measured.

After finished milking the receptacle, the metering cylinder and the milk lines ought to be cleaned. This is made so that cleaning water is flushed through the system, wherefore both inlet valves and outlet valves shall be open. In order to achieve this position of the valves the three-way valves 14a, b are adjusted to positions MW and W, respectively. This means that the line 15 is put under atmospheric pressure, while the line 16 is put under vacuum.

Due to that the vacuum relays 11a, b and 12a, b are influenced such that the lines from these ones to respective inlet valve and outlet valve are put under vacuum having the consequence that each inlet valve and outlet valve is put in open position.

The described apparatus functions as a meter not only for milk but also for other fluids.

In the embodiment described the apparatus furthermore has the function as an outlet valve for the receptacle 1.

The advantage of this outlet valve/milk meter is that its function is based on the use of the vacuum system existing in the milking plant. Due to that a both cheap and function secure system for metering milk at recorder milking is received.

As has been previously mentioned the magnet 3a of the piston 3 cooperates with the magnet valves 4a, b at the ends of the cylinder. In this connection each magnet valve 4a, b is sitting in a gable wall 50 (see FIG. 5) of the cylinder 2.

The magnet valve 4a, b comprises a magnet 51 and a holder 52 which is located in a cylindirical groove 53 in the gable wall 50. The magnet 51 preferably has a cylindrical design and can move freely in the holder 52.

According to the laws of physics magnets with the same poles repel each other, while magnets with different poles attract each other.

The intention with the magnet 3a of the piston 3 is that it shall influence the magnet 51 of the magnet valve 4a, b such that it is opened. The magnet valve is so arranged that it is opened when the magnet 51 is in that position shown in FIG. 5, i.e. when the magnet 51 is as close to the position 3 as possible. This means that the magnet 3a of the piston 3 must attract the magnet of the magnet valve. To make this possible the pole that is closest to the piston must be a south pole in one of the magnets in the gable if the pole is a north pole in the magnet in the seond gable and vice versa.

It is a wish that the gables shall be able to be made identical, which partly makes the production cheaper, partly eliminates the risk of incorrect assembling if for instance one of the gables has to be exchanged. This is, however, not possible if the magnet 51 is mounted into the gable in a conventional way, because this would mean that the magnets in the two gables should have the same pole directed to the piston.

According to the invention this problem has been solved in that way that the magnet can be turned over inside the holder 52 so that it will always be attracted by the magnet 3a of the positon 3. This is made possible by giving the holder 52 a design as appears from FIGS. 6a–c.

The holder 52 has a round bottom plate 60. From this bottom plate 60 at least two vertical ridges 61, 62 project, which in their upper parts are connected by a dome-like superstructure 63. The diametrical distance between the ridges 61, 62 is somewhat greater than the distance between one edge of the cylindrical magnet 51 and the diagonally opposite edge of the magnet 51. This superstructure 63 has a lateral extension that roughly corresponds to that of the bottom plate 60. Furthermore, the inner part of the dome faces the bottom plate, and the radius of the curvature of the dome is somewhat greater than the radius of the magnet 51 so that the magnet can be turned over inside the holder and against the dome if the magnet 51 should happen to have such a position that it is repelled by the magnet 3a of the piston 3.

The holder 52 is furthermore provided with at least two preferably diametrically opposite projections 64, 65, one 64 going out from the ridge 61 and the other one 65 from the ridge and under essentially a vertical angle in relation to the ridges 61, 62. The purpose of these projections 64, 65 is to spring back the holder against the gable wall 50 and by that contribute to shut respective line 19a, b to the magnet valve 4a, b. The projections 64, 65 cooperate with and slide in suitable means made in the gable wall 50.

To make it possible for the holder 52 to move in the cylindrical groove 53 in the gable wall 50 are for the sake of the two ridges 61, 62 two diametrically opposite slots arranged in the groove 53. In each gable 50 there are two shut-off valves, one 5a, b for the inlet and one 6a, b for the outlet. Each valve 70 comprises a holder 71, a membrane 72 and a distance means 73.

The membrane 72 comprises a central part 74 with a head 75 and two disc-like projections 76, 77 and is made in one piece of elastic material, preferably rubber. In this connection the diameter of the disc 77 is essentially greater than that of the disc 76. The reason why is that when vacuum exists on both sides of the valve 70, which means that the phase for the opening of the valve is in, the area that the vacuum in the space 78 acts upon has to be greater than the area that the vacuum in the space 79 acts upon.

The holder 71 is intended to carry the membrane 72 and for that purpose has a pin-like part 80 with a projection 81 at the very top of the pin, which is to be inserted into a corresponding recess in the central part 74 and heat 75 of the membrane. As a support for the disc 77 the holder 71 has a cylindrical foot 82 with a recess 83 into which a spring 84 interferes, which spring forces the valve to the right in the figure, i.e. towards a closing position.

A distance means 73 is arranged between the discs 76, 77. In order to keep the discs 76, 77 better in place these are provided with projections 85, 86 interfering into the distance means 73.

The valve 70 has two working positions, opened and closed. In open position vacuum acts upon the two sides of the valve. Due to the fact that the disc 77 has a much larger action area than the disc 76 the valve can be opened, i.e. be moved to the left in the figure, in spite of the action of the spring 84. In closed position atmospheric air is applied to the valve space 78, which in combination with the effect of the spring closes the valve 70.

The advantage with the valve 70 in comparison with conventional valves is that it is very compact and is built up by only three components: holder, membrane and distance means. Thus, the valve is very inexpensive to manufacture.

I claim:

1. Apparatus for metering the volume of a liquid and comprising means forming a metering chamber, a piston reciprocable between two end positions in said chamber, each stroke of said piston from one end position to the other corresponding to a certain volume, a liquid inlet conduit and a liquid outlet conduit each adapted for connection to said chamber on each side of the piston, two shut-off valves for each of said conduits, said valves being movable to a first condition wherein two of the valves are in open positions to connect the inlet conduit to the chamber on one side of the piston and connect the outlet conduit to the chamber on the other side of the piston while the other two valves are in closed positions, whereby the piston is moved by said fluid in the direction of said other side, said valves being movable to a second condition in which said positions are reversed, whereby said fluid moves the piston in the direction of said one side, means for sensing when the piston reaches each of said two end positions, said sensing means including a piston magnet carried by the piston and also including magnet devices located adjacent said end positions, respectively, each magnet device being activated by the piston magnet when the piston arrives at the adjacent end position, a vacuum source, and actuating means operable by vacuum from said source and atmospheric air, while under control of said sensing means, to move the shut-off valves alternately to said first and second conditions, said actuating means including control valves operable by said magnet devices, respectively, and relays operable by said vacuum and air under control of said control valves.

2. The apparatus of claim 1, in which said relays form a bistable circuit.

3. The apparatus of claim 1, comprising also means for adjusting said actuating means to move the shut-off valves to a condition differing from said first and second conditions.

4. The apparatus of any of claims 1, 2 and 3, comprising also a receptacle for receiving said liquid and connected to said inlet conduit, and means for adjusting said actuating means to move the shut-off valves to a third condition wherein two of the shut-off valves are in open position to connect the receptacle through the inlet conduit to the chamber on both sides of the piston while the ohter two shut-off valves are closed.

5. The apparatus of any of claims 1, 2 or 3, comprising also a counter operable by vacuum from said source and atmospheric air, while under control of said sensing means, to record the number of such piston strokes.

6. The apparatus of any of claims 1, 2 and 3, in which said actuating means also include throttling means connected to said relays for throttling the supply of vacuum thereto.

7. The apparatus of any of claims 1, 2 and 3, comprising also two gables, each gable having one of said control valves, a corresponding magnet device and two shut-off valves.

8. The apparatus of claim 7, in which each magnet device is a cylindrical magnet, each gable having a groove and a holder located in the groove, said magnet device being movably held by said holder.

9. The apparatus of claim 8, in which said holder includes a bottom plate and two ridges extending from the bottom plate, said holder also including a dome-like superstructure connecting said ridges at their upper parts, the diametrical distance between said ridges being somewhat greater than the distance between one edge of the cylindrical manget and the diagonally opposite edge.

10. The apparatus of claim 9, in which said holder also includes two diametrically opposite projections slidable in the gable.

11. The apparatus of claim 8 in which each shut-off valve includes a valve holder mounted in said gable, a membrane, and spacer means, the membrane being of elastic material in one piece and having a central part with a head and two disc-like projections between which the spacer means are located.

12. The apparatus of claim 11, in which said valve holder has a pin-like part with a projection and a cylindrical foot, a spring in the gable, said foot having a lower part provided with a recess coacting with said spring.

13. In a milking system having a vacuum source for operating the system in conjunction with atmospheric air, the combination of a milk-receiving receptacle, means forming a metering chamber, a piston receiprocable between two end positions in said chamber, a milk inlet conduit connected to said receptacle and having two branches for delivering milk to said chamber on opposite sides of the piston, a milk outlet conduit having two branches for connection to said chamber on opposite sides of the piston, four shut-off valves movable between open and closed positions in the four conduit branches, respectively, actuating means operable by vacuum from said source and atmospheric air to move the shut-off valves alternately to two different combinations of said positions for metering milk flow from said receptacle as one operating phase of the milking system, and means for adjusting the actuating means to move the shut-off valves to a third combination of said positions for performing a different operating phase of the milking system.

* * * * *